(12) United States Patent
Shen et al.

(10) Patent No.: US 7,706,152 B2
(45) Date of Patent: Apr. 27, 2010

(54) DC-DC CONVERTER FOR LOW VOLTAGE POWER SOURCE

(75) Inventors: Bing Shen, Cary, NC (US); Robert Hendry, Hillsborough, NC (US); Cynthia Watkins, Dunn, NC (US); Rama Venkatasubramanian, Cary, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 75 days.

(21) Appl. No.: 11/454,984

(22) Filed: Jun. 19, 2006

(65) Prior Publication Data

US 2007/0291514 A1 Dec. 20, 2007

(51) Int. Cl.
*H02M 3/22* (2006.01)
*H01H 47/26* (2006.01)

(52) U.S. Cl. .......................... 363/15; 361/162; 361/206

(58) Field of Classification Search ............... 363/15, 363/123, 131; 323/266; 361/160, 162, 205, 361/206

See application file for complete search history.

(56) References Cited

U.S. PATENT DOCUMENTS

| | | | | |
|---|---|---|---|---|
| 3,310,725 A | * | 3/1967 | Scarr et al. ................... | 363/16 |
| 3,571,692 A | * | 3/1971 | Andren ........................ | 363/16 |
| 3,604,924 A | * | 9/1971 | Standaart ................... | 346/33 R |
| 3,648,152 A | * | 3/1972 | Low ............................ | 322/2 R |
| 3,818,304 A | * | 6/1974 | Hursen et al. ............... | 310/306 |
| 5,180,950 A | * | 1/1993 | Nilssen ........................ | 315/127 |
| 5,288,336 A | * | 2/1994 | Strachan et al. ............ | 136/200 |
| 6,674,628 B1 | * | 1/2004 | Wohlfarth ................... | 361/153 |
| 7,068,017 B2 | * | 6/2006 | Willner et al. .............. | 323/272 |

OTHER PUBLICATIONS

Low-Input-Voltage, Low-Power Boost Converter Design Issues, Jonathan W. Kimball et al., IEEE Power Electronics Letters, vol. 2, No. 3, Sep. 2004; pp. 96-99.
CMOS Micromachined Cantilever-in-Cantilever Devices with Magnetic Actuation, B. Shen et al. ,IEEE Electron Device Letters, vol. 17. No. 7, Jul. 1996; pp. 372-374.
Design of A Low-Input-Voltage Converter for Thermoelectric Generator, John M. Damaschke, IEEE Transactions on Industry Applications, vol. 33 No. 5, Sep./Oct. 1997; pp. 1203-1207.
Principles of Tunnel Diode Circuits, Woo F. Chow, John Wiley & Sons, Inc., 1964; pp. 70-126 and 150-211.

* cited by examiner

*Primary Examiner*—Gary L Laxton
(74) *Attorney, Agent, or Firm*—Oblon, Spivak, McClelland, Maier & Neustadt, L.L.P.

(57) ABSTRACT

A power conversion unit and method for converting DC power. The power conversion unit includes a self-oscillating device configured to convert a DC voltage into a self-oscillating alternating current AC signal, a transformer connected to the self-oscillating device and configured to transform the self-oscillating AC signal into a transformed AC signal, and an AC-to-DC converter configured to convert the transformed AC signal into a DC signal. The method generates a self-oscillating current, transforms the self-oscillating current into a transformed AC signal, and converts the transformed AC signal into a DC signal.

16 Claims, 5 Drawing Sheets

DC-DC CONVERTER FOR LOW VOLTAGE POWER SOURCE

DISCUSSION OF THE BACKGROUND

1. Field of the Invention

The invention relates to a power converter suitable for conversion of low voltage sources to more usable voltage levels.

2. Background of the Invention

Thermoelectric power generation offers a unique and attractive alternative to conventional battery power generation due to its waste heat energy harvesting capabilities. It is especially suited for many low power and portable applications such as supporting remote sensor operations. The thermoelectric generator's output voltage is directly proportional to the temperature difference between its two junctions. In many cases, a small output voltage with a large current is obtainable with the thermoelectric generator when the temperature difference is less than 20K. Since many practical applications require a higher voltage than is obtainable with the thermoelectric generator, a DC-DC step up converter is important for this unconventional power supply.

Although the theory of a DC-DC converter has been well established, the use of a low input voltage (less than 0.7V) to drive a DC-DC converter is still a research subject.

Conventionally, step-up DC-DC converters have switched the input direct current to an alternating current, i.e. a DC to AC conversion followed by AC-AC transformation to a stepped-up voltage, followed by rectification of the stepped up voltage. One challenge for a low voltage input converter has been to find a switching mechanism providing maximum operation efficiency. MOSFET's have been used as switching devices in most converters due to their low on-resistance and low required gate current, leading to high converter efficiency. However, the switching voltage required is usually high as compared to voltages produced by thermoelectric generators.

A self-starting set of twin converter circuits containing a main converter and a starter circuit converter has been used to transform low voltage DC inputs. In that work, a normally-on transistor was used to perform switching for a low voltage input, and an output of a starter converter was used to drive a MOSFET based main converter. While the circuitry operated at low efficiency at the beginning of the operation when the starter circuit was performing the initial conversion, the main converter offered a relatively high conversion efficiency once the starter provided adequate switching voltage for the main converter.

The development of low voltage input power supplies has been reported for example in the following reference articles, all of which are incorporated herein by reference in their entirety:

[1] J. W. Kimball, IEEE Power Electronics Letters, Vol. 2, No. 3, September 2004;
[2] J. M. Damaschke, IEEE Trans. Ind. Applicat. Vol. 33, pp. 1203-1207, September/October 1997;
[3] B. Shen, et al., IEEE Electron Device Letters, vol. 17, no. 7, pp. 372-374, July 1996; and
[4] W. F. Chow, "Principles of tunnel diode circuits", J. Wiley and Sons, Inc., 1964.

Despite this work, realization of suitable power conversion solutions has not been without problems limiting power extraction from low voltage power sources.

SUMMARY OF THE INVENTION

Accordingly, one object of the present invention accomplished in various of the embodiments is to provide a system and method for converting DC power.

Another object of the present invention accomplished in various of the embodiments is to provide a system and method that transforms an input from a DC voltage source into an AC signal.

Yet another object of the present invention accomplished in various of the embodiments is to provide a system and method that transforms an AC signal produced from a DC voltage source into a stepped-up AC signal for rectification.

Still another object of the present invention accomplished in various of the embodiments is to provide a Reed switch for transformation of an input from a DC voltage source into an AC signal.

Still another object of the present invention accomplished in various of the embodiments is to provide a tunnel diode for transformation of an input from a DC voltage source into an AC signal Various ones of these and other objects are provided for in certain ones of the embodiments of the present invention.

In one embodiment of the present invention, a novel power conversion unit is provided. The power conversion unit includes a self-oscillating device configured to convert a DC voltage into a self-oscillating alternating current AC signal, a transformer connected to the self-oscillating device and configured to transform the self-oscillating AC signal into a transformed AC signal, and an AC-to-DC converter configured to convert the transformed AC signal into a DC signal.

In one embodiment of the present invention, a method for converting DC power is provided. The method generates a self-oscillating current, transforms the self-oscillating current into a transformed AC signal, and converts the transformed AC signal into a DC signal.

It is to be understood that both the foregoing general description of the invention and the following detailed description are exemplary, but are not restrictive of the invention.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

With recent advancements in thermoelectric material performance, thermoelectric generators have become a viable alternative for power generation using small temperature differentials with benefits that can not be found in other energy conversion methods. The power generated by a thermoelectric generator, using a small ΔT, is characterized by a relatively high current (~0.5 A), but a relatively low voltage (<0.3V), which is often not suited for many practical applications. In order to make use of the thermoelectric generated power in applications requiring a higher voltage, a DC-DC step up converter that can handle low input voltage is needed.

Commercial DC step up converters require an input voltage of at least 0.7 volts, which is the minimal voltage required for operating a bipolar junction switch. The present invention utilizes the current switching in which the DC voltage output is converted to an alternating current.

In one embodiment of the present invention, a normally-on transistor and a tunnel diode are utilized to achieve a low voltage current oscillation. In another embodiment of the present invention, an electromagnetic actuated mechanical switch is utilized to a low voltage current oscillation.

Almost all the DC to AC conversion actions in modern DC-DC converters are accomplished using solid state switches which are driven by an electrical voltage. This requirement becomes an impediment for a low input voltage converter design. To overcome this impediment, the present invention utilizes switching devices that are actuated by an electrical current rather than by voltage.

Figure 1:
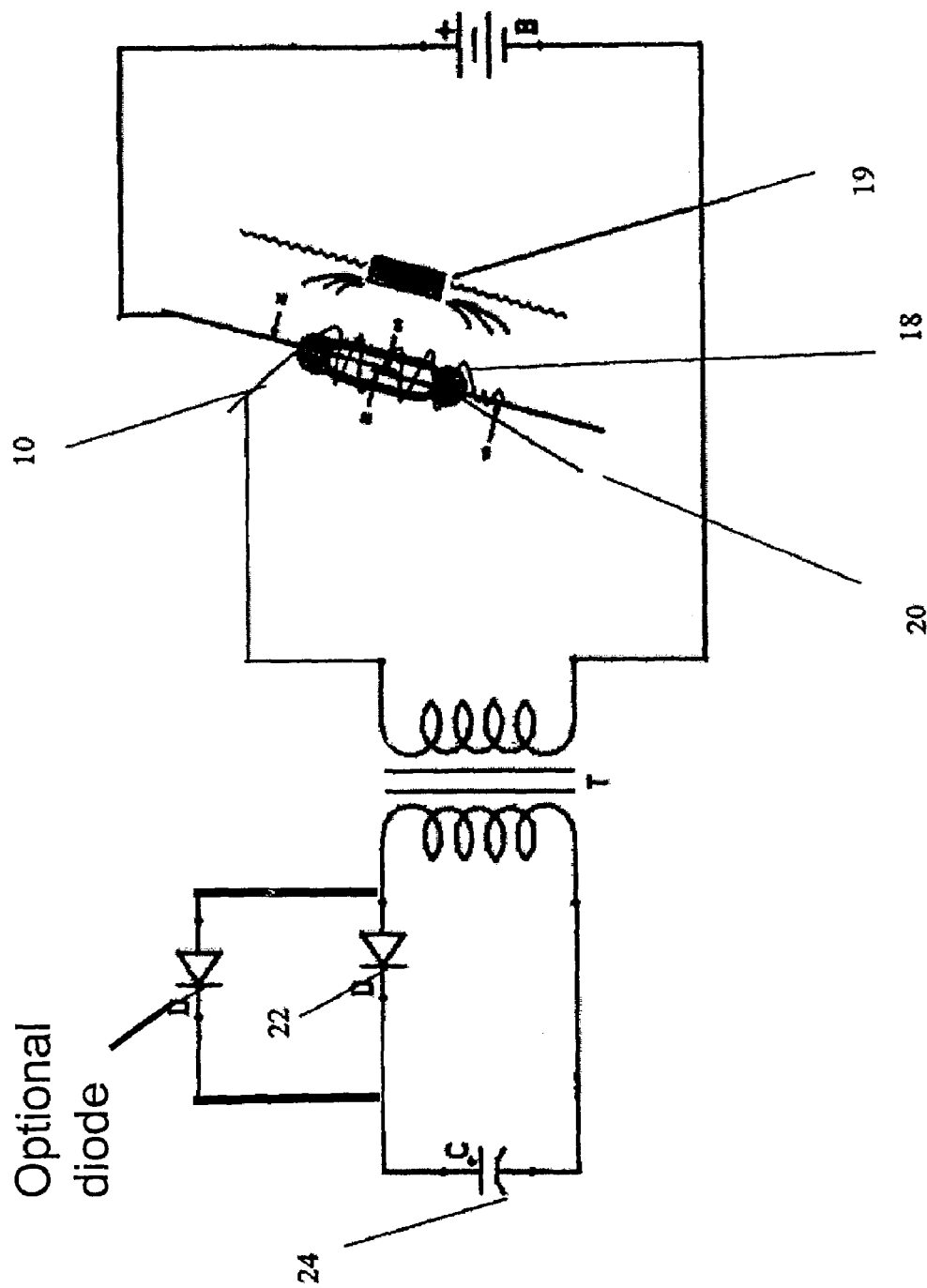
FIG. 1 is a schematic diagram of a Reed switch based converter according to one embodiment of the present invention.

Referring now to the drawings, wherein like reference numerals designate identical, or corresponding parts throughout the several views, and more particularly to FIG. 1. FIG. 1 is a schematic diagram of a Reed switch based converter according to one embodiment of the present invention. A Reed switch 10 contains a magnetic cantilever structure 20 which will deflect under the presence of a magnetic field to make or break electrical contacts.

For example in commercially available Reed switches, a Reed switch includes two or three springy metal reeds that have typically been plated to form long-life contacts at the tips. Reed switches often are encapsulated in a sealed glass tube. A two-reed type switch has normally open (NO) contacts which close when operated, and a three-reed type switch is a changeover, i.e. it has a pair of normally open (NO) and a pair of normally closed (NC) contacts. When the switch is operated, both these pairs change to the opposite state. Reed switches are actuated by a field, as in the present invention, from an electromagnet (i.e., a coil) placed in close proximity. This field causes the reeds to become magnetic, the ends are attracted and the contacts either open or close. Removal of the magnetic field allows the springy reeds to restore the contacts to their original state. Reed switches typically have only a momentary action—their contacts revert back to their original state as soon as the magnetic field diminishes.

In one embodiment of the present invention, as illustrated in FIG. 1, a Reed switch 10 is connected between a voltage supply 12 and a transformer 14, depicted as element "T" which is used to step up the input voltage. The Reed switch 10 is more specifically incorporated in the current loop of the right hand side (input) of the transformer 14, as illustratively shown in FIG. 1. A current coil 18 in series with the Reed switch 10 is wrapped around the Reed switch 10. As the coil 18 is energized by the input voltage, a magnetic field is created causing the magnetic cantilever structure 20 in the Reed switch to break contact. The field in the coil 18 opposes (in this illustrative example) the field from permanent magnet 19. Afterwards, the coil 18 loses energy, and the Reed switch 10 is reconnected and the coil 18 once again becomes energized. Such sequences repeat themselves and generate AC current on one side of the transformer T. The transformer T then steps up the voltage, and diode 22 and capacitor 24 on the other side of the transformer convert the stepped up AC voltage to an output DC voltage 26. The operational input voltage of a Reed switch will depend on specific details of the magnetic cantilever, the coil, and the permanent magnet; however, input voltages less than 0.3 V and in the range from 0.3 V to 0.7 V can be used in the Reed switches of the present invention to permit oscillating currents in the primary side of the transformer.

An example of a Reed switch based DC-DC converter performance realized in the present invention is given below:

Input Voltage: 0.3 V; Input Current 0.5 A; Output Voltage 2.5 V; Output load resistance 1000Ω; Output Current 2.5 mA; Output Power 6.35 mW; Efficiency 4.17%. The Reed Switch model number used in this example was HYR-4003. Transformer used had a step-up transformation ratio of 1:8 and the rectifier specifications were the same that were used for the tunnel diode based converter example.

There are many variations of the conversion circuit of FIG. 1 that are possible in the present invention. For example, the transformer 14 could be replaced by an inductor based boost converter, and the electromagnetic coil can both activate the Reed switch and act as a booster inductor. U.S. Pat. No. 5,654,626, the entire contents of which are incorporated herein by reference, entitled Boost-converter with low losses describes boost converters and their operation.

One advantage to the Reed switch based approach is its potential conversion efficiency. A thermoelectric generator typically has internal resistance of a few mOhms. In one embodiment of the present invention, the on-resistance of an electromagnetic based switch can easily be tailored to maximize the power output. The resistance can be changed for example through a change in the number of windings in the coil or by placing a resistance in series with the coil. While energy loss is caused by the mechanical switching action occurring during the circuit operation, these losses are not severe and can be minimized according to the present invention by miniaturizing the electromagnetic switches using MEMS technology. U.S. Pat. No. 6,989,500, the entire contents of which are incorporated herein by reference, entitled Liquid metal contact reed relay with integrated electromagnetic actuator describes miniaturized Reed switches and their operation.

Figure 2:
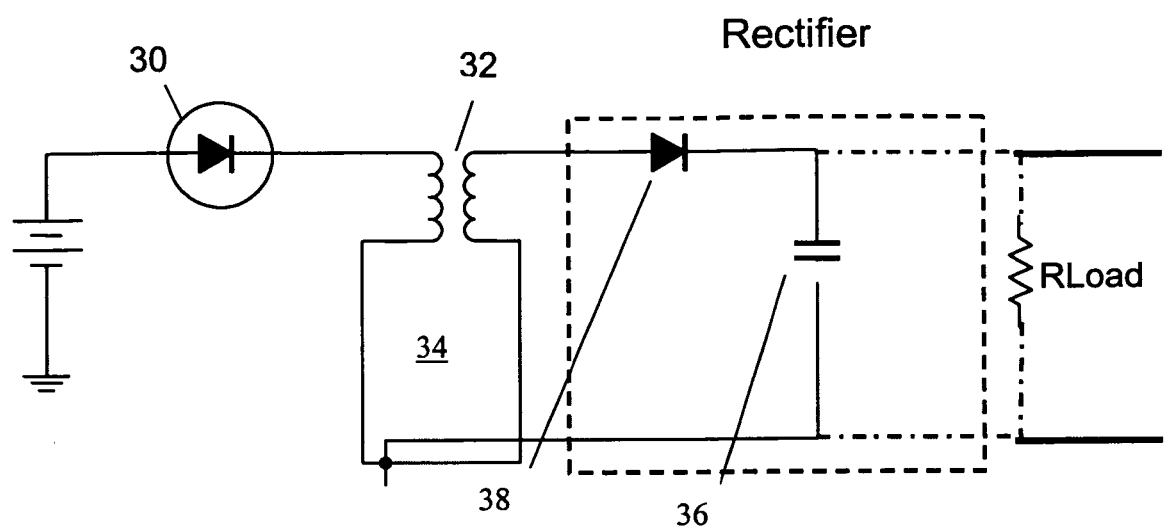
FIG. 2 is a schematic illustration of a tunnel diode based oscillation circuit according to one embodiment of the present invention.

In another embodiment of the present invention, the DC to DC converter can be include a tunnel diode device. In this embodiment, a tunnel diode can be used to generate current oscillations from a low voltage source. As shown in FIG. 2, a tunnel diode 30 is disposed in series with transformer windings 32 (i.e., an inductor) on one side of transformer 34. The operational input voltage of a tunnel diode will depend on specific details of the tunneling barrier, the doping, and the internal capacitance of the tunnel diode; however, input voltages in the range from 0.065V-0.5 V can be used in the tunnel diode of the present invention to permit oscillating currents in the primary side of the transformer. The tunnel diode supplies an internal capacitance that in series with the inductance of the transformer 32 and the negative resistance characteristics of the tunnel diode produce self oscillations (as described below). On the other side of the transformer 34, a capacitor 36 is wired in parallel with tunnel diode 38 to rectify the AC current.

Figure 3:
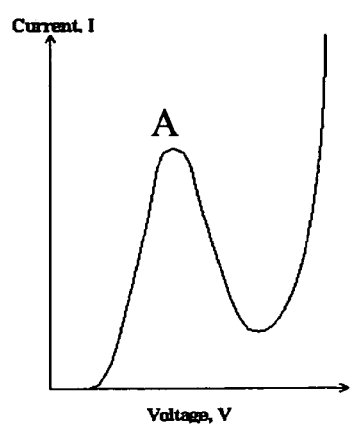
FIG. 3 is a schematic illustration of the I-V characteristics of a tunnel diode.

On the input side, if the input voltage $V_{in}$ falls within the negative differential resistance (NDR) of the tunnel diode, a relaxation oscillation will occur due to its DC instabilities. U.S. Pat. No. 5,554,860, the entire contents of which are incorporated herein by reference, entitled Resonant tunneling transistor noise generator describes tunnel diodes and their operation. The oscillation process is shown in FIG. 3 for illustration of this embodiment of the present invention.

Suppose that the voltage applied to the tunnel diode is larger than the voltage at point "A." On this side of "A," the current flowing in the tunnel diode will increase with lower voltages. Furthermore, the instantaneous voltage across the tunnel diode is a function of the total applied voltage and the instantaneous voltage across the inductor of the primary side of the transformer (i.e., L dI/dt, where L is the inductance in the transformer and I is the instantaneous current flowing). Hence, increasing the current will increase the voltage drop across the inductor, thereby reducing the voltage across the tunnel diode, leading to higher current flow and further reduced voltages across the tunnel diode. This progression continues until the voltage across the tunnel diode is lower than point "A." whereby further decreases in voltage will decrease the current flow in the tunnel diode, thereby decreasing L dI/dt, and hence increasing the instantaneous voltage across the tunnel diode. As this progression continues the tunnel diode operates in a voltage regime to the left and right of point "A" producing an oscillating current on the primary side of the inductor.

Hence, according to one embodiment of the present invention, inducement of current oscillations at relatively low output voltage levels such as from a thermoelectric generator provide an AC signal that is transformed (i.e., stepped up in AC voltage) by a transformer to higher AC voltage levels, and thereafter rectified. An example of tunnel diode characteristics suitable for the present invention is given below:

Forward Voltage @Ipeak=500 mV
$I_{peak}$ max.=1.0 mA
Peak Current Tol.=0.10 mA
V(P) Peak-Point Voltage=65 mV
V(V) Valley-Point Voltage=350 mV
Ratio $I_{peak}/I_{valley}$ Min.=5.0
I(F) Max. Forward Current=5.0 mA
f(co) Res. Cutoff Freq=2.3 GHz
R(neg) Negative Res.=125Ω
r(s) Max. Series Res.=1.5Ω
L(s) Max, Series Inductance=0.50 nH
C(t) Max. Total Capacitance=10 pF
Semiconductor Material=Germanium
Comparisons:

The tunnel diode based converter of the present invention required the minimal input voltage, presumably due to the tunnel diode's negative different resistance region. However, at least in theory, the minimal input voltage for tunnel diode based converter can not be lower than 50 mV. The Reed switch based converter of the present invention exhibited a better efficiency and higher output power than the tunnel diode based converter. Presently, these attributes of the Reed switch based converter of the present invention are presumed to be due to Reed switch based converter's comparable on-resistance with the thermoelectric power supply—both are at mOhm range, enabling higher power extraction and lower dissipated power on the switch itself. However, reliability due to its non-solid state switching operation may be a concern for some applications of the present invention.

In one embodiment of the present invention, the Reed based converter and the tunnel diode based converter can serve as the initial converters supplying DC power to a conventional DC-DC converter using bipolar transistor switches (as discussed above).

In one embodiment of the present invention, the performance of the Reed switch based converter is improved by application of less energy consuming electromagnetically actuated switches (produced by the above-discussed MEMS technology) than the convention Reed Switches used above for demonstration of the present invention. MEMS based Reed switches, according to the present invention, can provide for a lower requisite input voltage, provide a higher conversion efficiency, and permit circuit miniaturization and improved reliability.

In one embodiment of the present invention, the performance of the tunnel diode based converter is improved by application of a circuit configuration that reduces the input resistance so that the multiple diodes are connected in parallel. Lower input resistance will result in higher power extraction with lower in-circuit power consumption and thus higher conversion efficiency.

Figure 4:
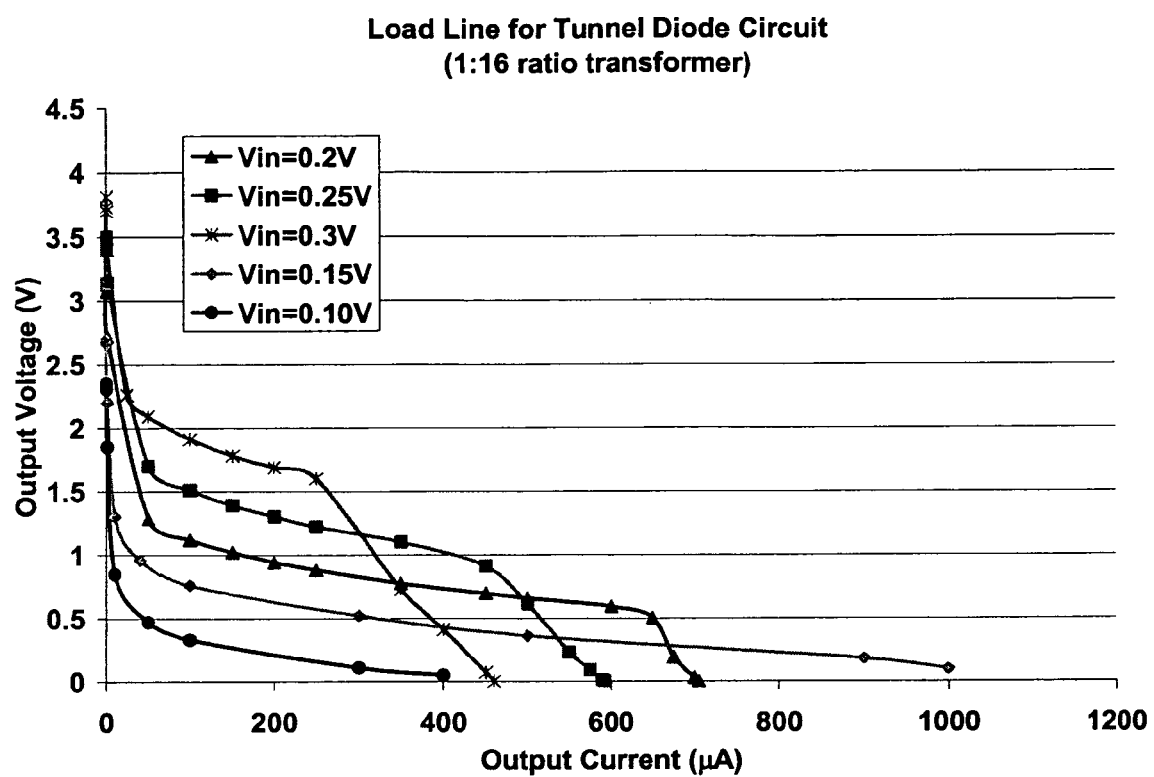
FIG. 4 is a schematic depicting a load line for a tunnel diode converter, according to one embodiment of the present invention.

FIG. 4 is a schematic depicting a load line for a tunnel diode converter, according to one embodiment of the present invention, in which a transformer ratio of 1:16 is used for the step up transformation. This figure shows the stepped up DC output voltage from the rectifier circuit versus output current. The different curves represent data taken using varying DC input voltages ranging from 0.1-0.3 Volts.

Figure 5:
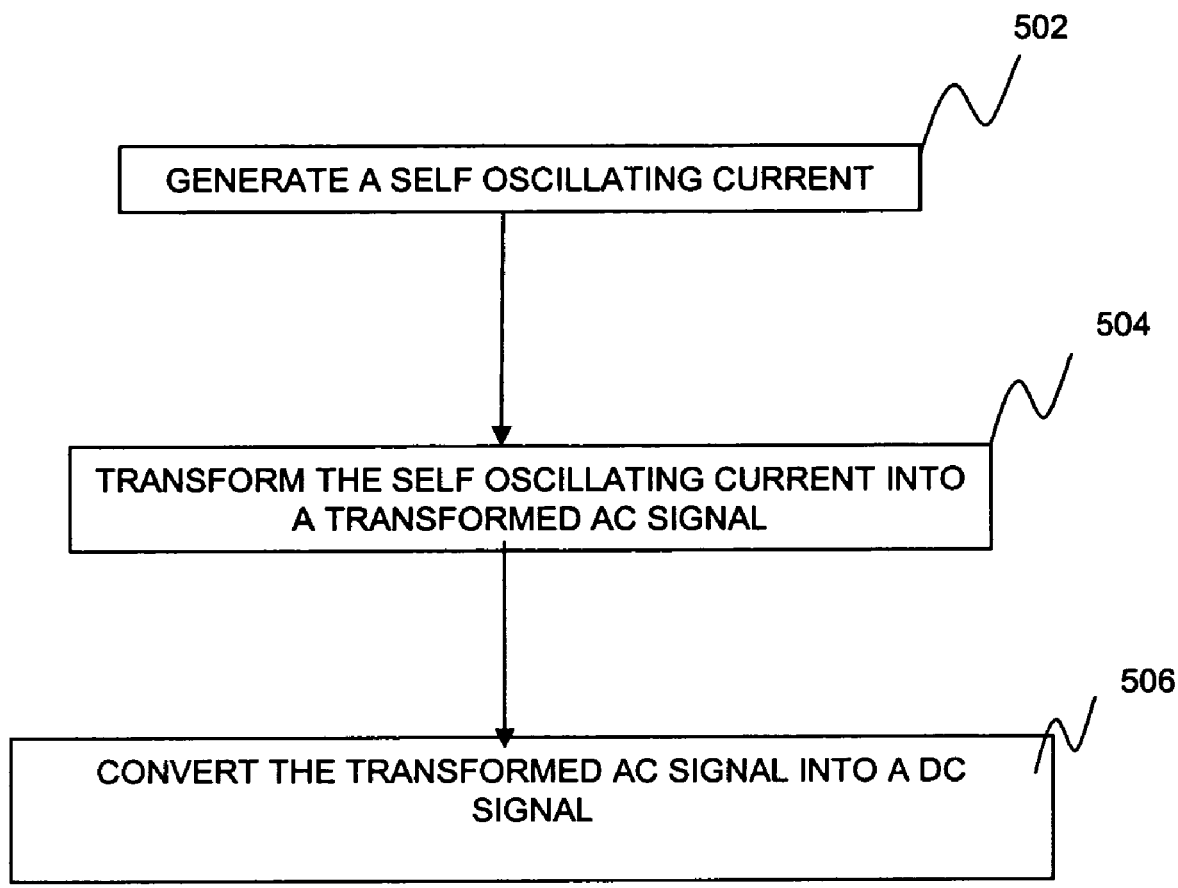
FIG. 5 is a flow chart illustrating a method of the present invention for converting DC power.

FIG. 5 is a flowchart illustrating a method of the present invention for converting DC power. At 500, the method converts input from a DC voltage source into a first alternating current AC signal using a self-oscillating device. At 502, the method transforms the first AC signal into a stepped up AC signal. At 504, the method converts the stepped up AC signal into a DC signal.

In general, the present invention provides for a method and system for power conversion.

The method and system utilize self-oscillating devices (such as for example the tunnel diode and Reed switch configurations discussed above) to convert input from a DC voltage source into a self-oscillating signal (i.e., a first alternating current AC signal), which can be transformed to a higher (or lower) voltage AC signal (i.e., a second alternating current AC signal), which thereafter is rectified. The present invention has utility in converting low voltage DC sources (such as for example from thermopiles and thermoelectric devices) into a higher output DC voltage. However, the present invention has utility in the transformation of higher voltage DC sources (such as from photovoltaic cells or fuel cells) to more appropriate levels for power consumption. This transformation may indeed involve step up transformation, but also can include step down transformations, if needed for a particular application.

As discussed above, the Reed switch can include a coil connected in series with the input DC voltage source and can include a magnetic cantilever switch connected in series with the DC voltage source. The magnetic cantilever switch can periodically open when current flow through the Reed switch reaches a predetermined level. In one embodiment of the present invention, the magnetic cantilever switch could be configured to open when current flow through the Reed switch reaches an upper set point, and the magnetic cantilever switch could be configured to close when current flow through the Reed switch reaches a lower set point. In one embodiment of the present invention, the magnetic cantilever switch could be configured to close when current flow through the Reed switch reaches an upper set point, and the magnetic cantilever switch could be configured to open when current flow through the Reed switch reaches a lower set point.

In one embodiment of the present invention, the Reed switch is a micromechanical switch thereby offering advantages in efficiency and reliability.

In one embodiment of the present invention, the self-oscillating device is a tunnel diode connected in series between the input DC voltage source and the transformer. The tunnel diode has a negative differential resistance regime of operation, where for example an increase in applied voltage will result in a decrease in current flow. The tunnel diode can be configured to operate in the negative differential resistance regime for input voltages between 65 mV and 500 mV. Further, multiple tunnel diodes (wired together in parallel) and in series with the transformer windings can be used.

In one embodiment of the present invention, the AC-DC converter includes a rectifying circuit. In another embodiment of the present invention, the output DC voltage is input to a separate DC-DC converter, which converts the DC signal into a stepped up DC voltage signal.

In one embodiment of the present invention, the power conversion unit includes the DC voltage source. That is low voltage sources such as a heat-to-electricity conversion device can be integrated to the power conversion unit. Examples of suitable heat-to-electricity conversion devices include thermoelectric devices, thermopiles, and Seebeck devices.

Other examples of low voltage sources to which the present invention is applicable include small bandgap solar cells using sunlight, thermovoltaic cells using blackbody radiation from heat sources, ferroelectric power devices, pyroelectric devices, and magneto-caloric devices, etc. Furthermore, voltages from fuel cells as well as thermionic power sources and low voltage electrochemical batteries using low work function metals can be transformed by the present invention. The present invention provides advantages when converting power from low voltage thermionic power sources (which use thermionic emission to produce external power) and from low voltage electrochemical battery cells that normally have to be stacked in series order to produce suitable voltage outputs.

Figure 6:
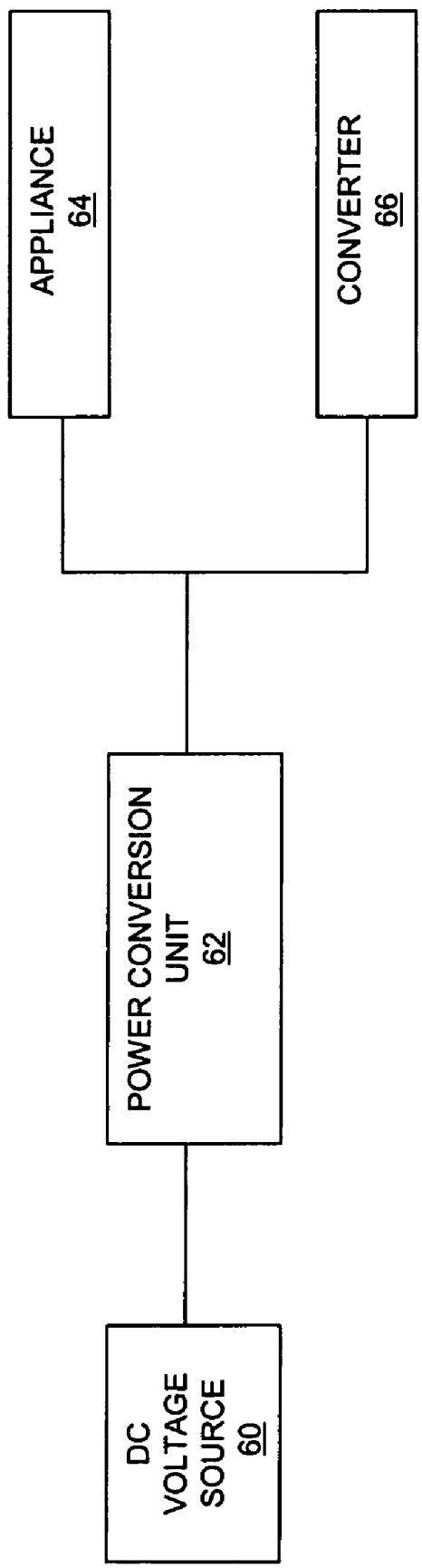
FIG. 6 is a schematic of a system for power conversion using the power converters of the present invention.

Indeed, FIG. 6 is a schematic of a system for power conversion using the power converters of the present invention. A DC voltage source 60 provides a DC signal to power conversion unit 62, which includes the self-oscillating current generators such as for example the Reed switches and tunnel diodes discussed above. After transformation and rectification of the self-oscillating current, the output from the power conversion unit 62 may be supplied directly to an appliance 64 using the power, or supplied to another power converter or power conditioning and filtering device 66 (using the technology of the present invention or conventional DC-DC converters).

Numerous modifications and variations on the present invention are possible in light of the above teachings. It is, therefore, to be understood that within the scope of the accompanying claims, the invention may be practiced otherwise than as specifically described herein.

The invention claimed is:

1. A power conversion unit for a low voltage thermoelectric generator comprising:
   a self-oscillating two-terminal device configured to convert a DC voltage from said low voltage thermoelectric generator of less than 0.7 V into a self-oscillating alternating current AC signal;
   a transformer connected to the self-oscillating device and configured to transform the self-oscillating AC signal into a transformed AC signal; and
   an AC-to-DC converter configured to convert the transformed AC signal into a DC signal,
   wherein said self-oscillating two-terminal device includes, for terminals, only an input terminal connected to the low voltage thermoelectric generator and an output terminal connected to the transformer.

2. The unit of claim 1, wherein the self-oscillating device comprises a Reed switch.

3. The unit of claim 2, wherein the Reed switch comprises:
   a coil connected in series with a source of the DC voltage; and
   a magnetic cantilever switch connected in series with the source of the DC voltage and configured to periodically open when current flow through the coil reaches a predetermined level.

4. The unit of claim 3, wherein the magnetic cantilever switch is configured to open when current flow through the coil reaches an upper set point.

5. The unit of claim 3, wherein the magnetic cantilever switch is configured to close when current flow through the coil reaches a lower set point.

6. The unit of claim 3, wherein the magnetic cantilever switch is configured to close when current flow through the coil reaches an upper set point.

7. The unit of claim 3, wherein the magnetic cantilever switch is configured to open when current flow through the coil reaches a lower set point.

8. The unit of claim 2, wherein the Reed switch comprises a micromechanical switch.

9. The unit of claim 1, wherein the self-oscillating device comprises a tunnel diode connected in series between a source of the DC voltage and the transformer.

10. The unit of claim 9, wherein the tunnel diode is configured to operate for input voltages in a negative differential resistance regime where an increase in voltage results in a decrease in current flow.

11. The unit of claim 10, wherein the tunnel diode is configured to operate in a range between 65 mV and 500 mV.

12. The unit of claim 9, further comprising:
    at least one more tunnel diode connected in parallel with said tunnel diode connected in series between the source of the DC voltage and the transformer.

13. The unit of claim 1, wherein the AC-DC converter comprises a rectifying circuit.

14. The unit of claim 1, further comprising:
    a subsequent DC-DC converter configured to convert the DC signal into a stepped up DC voltage signal.

15. A thermoelectric power supply system comprising:
    a low voltage thermoelectric generator;
    a self-oscillating two-terminal device configured to convert a DC voltage source from the low voltage thermoelectric generator of less than 0.7 V into a self-oscillating alternating current AC signal;
    a transformer connected to the self-oscillating device and configured to transform the self-oscillating AC signal into a transformed AC signal; and
    an AC-to-DC converter configured to convert the transformed AC signal into a DC signal,
    wherein said self-oscillating two-terminal device includes, for terminals, only an input terminal connected to the low voltage thermoelectric generator and an output terminal connected to the transformer.

16. The unit of claim 15, wherein the low voltage thermoelectric generator comprises at least one of a thermoelectric device, and a Seebeck device.

* * * * *